Jan. 21, 1964  M. R. HENDRICKSON  3,118,329
TUBE-MANDREL SUPPORT
Original Filed April 2, 1958  2 Sheets-Sheet 1
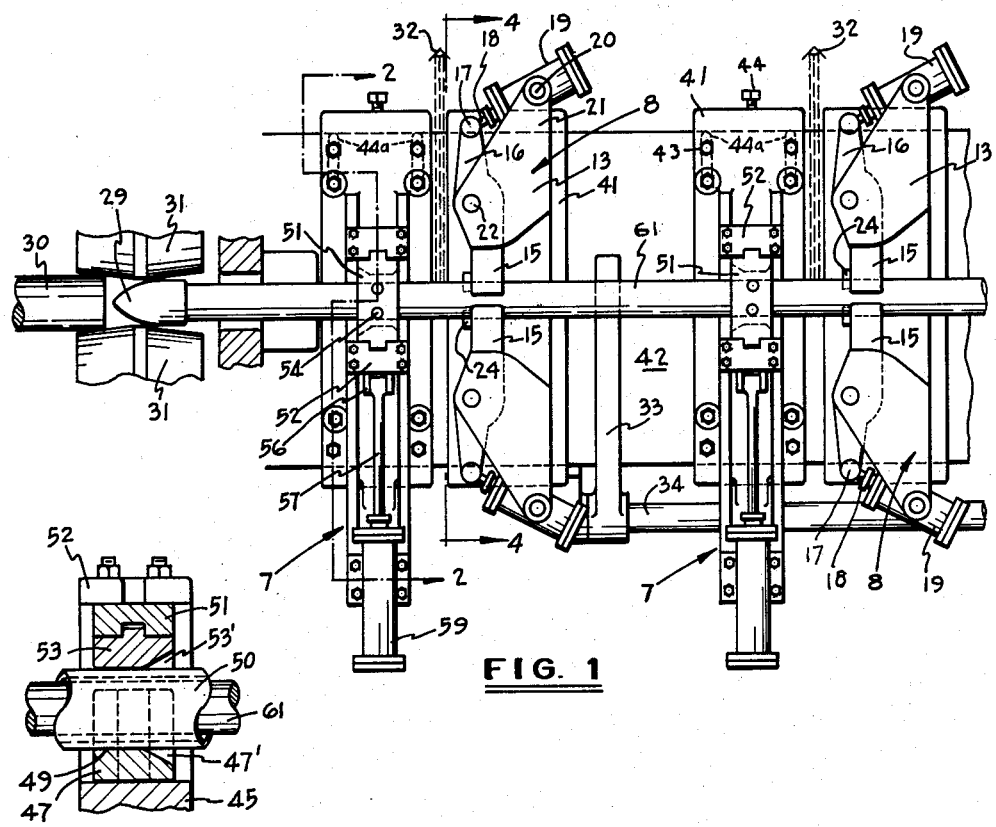
FIG. 1
FIG. 3
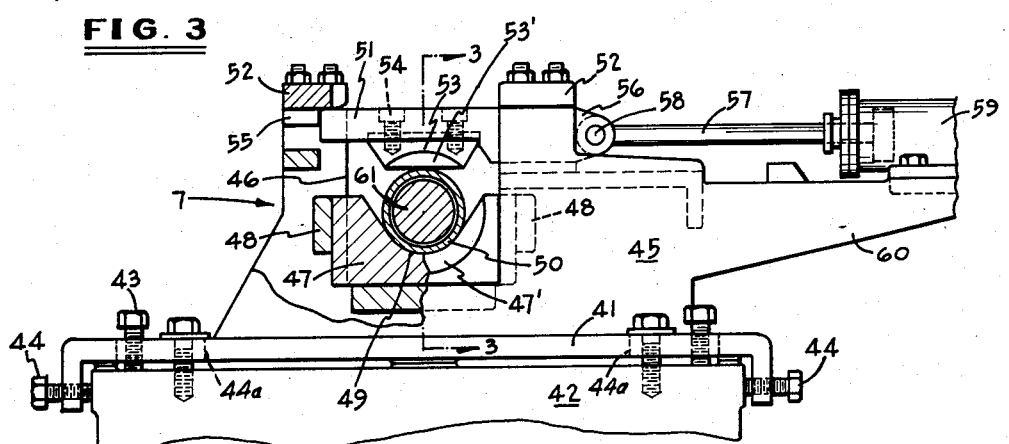
FIG. 2
INVENTOR.
MICHAEL R. HENDRICKSON
BY
ATTORNEY

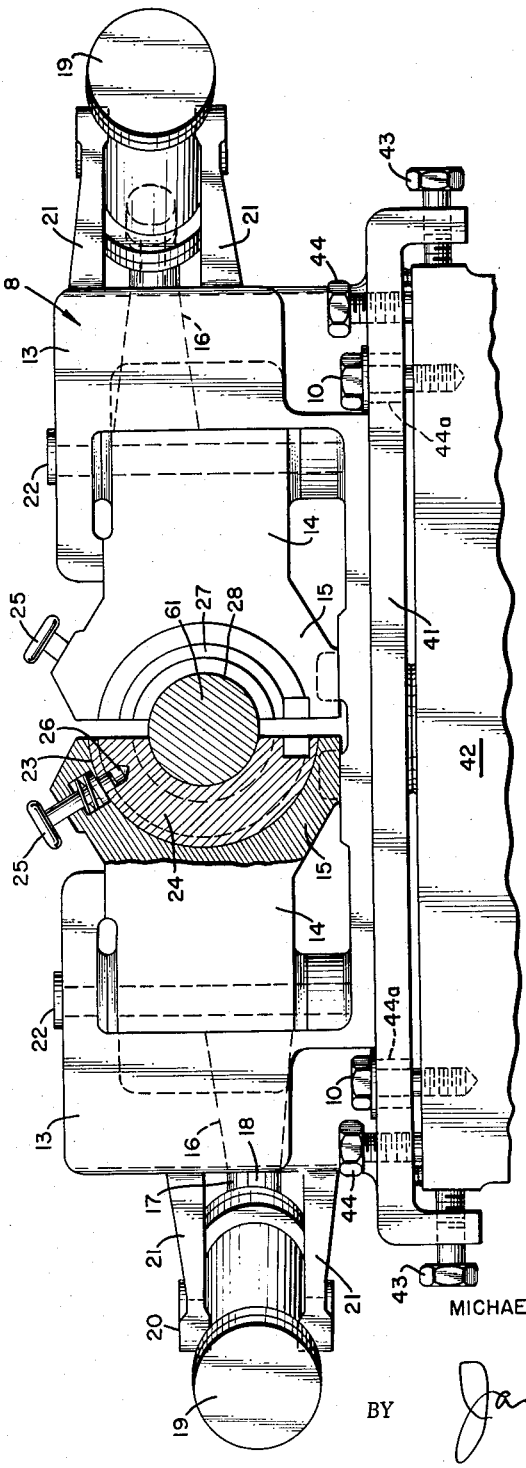

United States Patent Office 3,118,329
Patented Jan. 21, 1964

3,118,329
TUBE-MANDREL SUPPORT
Michael R. Hendrickson, 7297 La Croix Drive,
West Hollywood, Fla.
Original application Apr. 2, 1958, Ser. No. 725,893.
Divided and this application Jan. 26, 1960, Ser. No. 4,678
3 Claims. (Cl. 80—13)

This invention relates to tube mills and particularly to a bar and pierced hollow support for the making of seamless tubes and pipes of varying sizes and of various analysis.

The present application is a division of my copending application Serial No. 725,893, filed April 2, 1958 and now abandoned.

In the manufacture of seamless tubes, a piercing bar is provided having a piercing point and with the bar being engaged by a billet or workpiece fed in axial alignment with the bar and with the billet being rotatable on its axis and at the same time advanced over the bar and with the billet passing between forming rollers as it engages the piercing point. Basically, the piercing of billets in the manner just described is well known in the art.

The prime purpose of this invention is to provide guide means for the piercing bar and a guide means for the piercing bar and the pierced hollow being formed and whereby to prevent lateral bending or twisting of the bar during the piercing action and with the guide means being arranged in pairs throughout the length of the machine corresponding to the length of the pierced hollow being formed.

The invention embodies guide means that are arranged in substantially identical pairs, with one or a leading guide having fillers capable of receiving both the bar and the pierced hollow being formed while the following guide of each pair is provided with fillers to support the bar only and, with the following guide being automatically shifted away from the bar as the formed pierced hollow approaches the same, thereby forming a clearance for both the pierced hollow and the bar and with the procedure being progressively repeated throughout the length of the machine, effectively providing a guide for the bar and also providing an effective guide for the bar and the pierced hollow being formed.

The invention contemplates guide means as above noted and with each of the guide means adapted to receive guide forming blocks and with the blocks of each guide in each pair defining a substantially cylindrical opening. The guide block of the leading unit of each pair define the guide opening for the bar and the hollow being formed thereover while the guide blocks of the following or companion guide defines a guide opening for the reception of the bar only and with the guides of each pair being slightly spaced apart with respect to each other and with each pair spaced apart throughout the length of the machine so that initially the bar is supported against flexing or twisting at predetermined points throughout its length and as the hollow is being formed, it progressively has guiding engagement into the leading guide of each pair and, since the following guides are incapable of supporting the hollow, they are automatically shifted away from their supporting position with respect to the bar, thus forming a clearance for the progressive forming of the tube. No attempt is made to illustrate the following guides in detail since their structure has been fully disclosed and claimed in my co-pending application above identified.

The invention further contemplates novel mounting means for the guide devices whereby the several guide devices may be accurately adjusted so that the several filler blocks and their openings formed thereby are in axial alignment throughout the machine and each guide unit is individually adjustable both vertically and laterally so that all of the guides throughout the length of the machine may be adjusted to such a fine degree that the bar can be supported in an accurate manner that prevents vibration or whipping during its rotation. The invention further contemplates guide devices as above noted and with the filler blocks being replaceable to accommodate hollows of different diameter or for the replacement of the blocks when they are sufficiently worn as to prevent a true axial rotation of the piercer bar and the hollow.

Other novel features of construction and operation of the device will be more clearly apparent during the course of the following description, reference being had to the accompanying drawings wherein has been illustrated the preferred forms of the device and wherein like characters of reference are employed to denote like parts throughout the several figures.

Referring to the drawings:

FIGURE 1 is a partial plan view of a machine constructed in accordance with the invention, FIGURE 2 is a section taken on line 2—2 of FIGURE 1, parts being shown in elevation, FIGURE 3 is a section taken on line 3—3 of FIGURE 2, and FIGURE 4 is a section taken on line 4—4 of FIGURE 1.

Referring specifically to the drawings, it will be observed that there has been indicated a plurality of pairs of guide devices including a leading guide and a following guide. The leading guide has been indicated by the numeral 7, while the following guide has been indicated by the numeral 8. Each of the guide devices in each pair are carried by base plates 41, mounted upon the main machine base 42 and adjustable both laterally and vertically by adjusting screws 43 and 44 the slots 44a permitting the required lateral adjustment. The leading guide 7 of each pair, throughout the length of the machine are substantially identical in construction, while the following guide 8 of each pair are substantially identical.

The base plate 41 of the leading guide 7 carries a preferably integral upstanding block 45 that is transversely slotted at 46 for the reception of a removable guide block 47. The guide block 47 is held within guides 48 carried by the block 45 and the block 47 is semi-cylindrically grooved cross-wide upon its upper face to form a guiding cradle 49. The cradle 49 as shown in FIGURES 2 and 3 is formed upon an arc having a diameter corresponding to the diameter of the hollow 50 being formed over a piercing bar 61.

Shiftable over and into overlying relation to the line of travel of the hollow being formed is a slide 51 engaging a suitable channel formed in the block 45 and held against upward movement by cap plates 52. The slide 51 carries a replaceable block 53 that depends into the slot 46 and with its underside and the bottom of the groove 49 corresponding to the diameter of the hollow being formed. The block 53 is held in any desirable manner such as by screws 54 and whereby the block 53 is replaceable. In its guide position, the slide 51 is limited to its operative guiding position by suitable stop 55. The slide 51 carries a pair of spaced apart ears 56, receiving the head portion of a piston rod 57, pinned to the ears by a pin 58. The rod 57 engages a suitable piston, shown in dotted lines, within a cylinder 59 that is rigidly supported upon an extension arm 60 carried by the block 45. The piston within the cylinder 59 is actuated by any conventional source of compressed air (not shown) to pull the slide 51 away from the guide area to permit the hollow 50 to be removed from the machine after complete forming. The blocks 47 and 53 are beveled upon their forward edges, as indicated at 47' and 53', to facilitate the entry of the hollow 50 as it is progressively formed over the bar 61. The block 53 is spaced from the bottom of the groove 49 a distance corresponding to the diameter of the hollow being formed and it will be apparent, that the blocks 47 and 53 may be removed and substituted with blocks that define a guide opening for hollows of varying diameters. As before pointed out, the leading guide 7 of each pair of units constitutes the supporting and guiding means for both the hollow 50 and the forming bar 61, while the following guide, indicated as a whole by the numeral 8 defines an opening of such diameter that such opening constitutes a guide for the bar 61 only.

Each of the following guides 8 are mounted or carried by similar base plates 41 that are adjustably supported upon the machine base 42 by adjusting screws 43 and 44. Each of the base plates 41 of the following guides 8 carry preferably integral upstanding U-shaped brackets 13 and with the brackets 13 at each side of the base 41 being in opposed relation. Each of the brackets 13 pivotally receive yokes 15, such as that illustrated in my co-pending application above identified. Each of the yokes carry crank arms 16 that are pivotally connected at their outer ends as at 17 with piston rods 18 carried by pistons, not shown, that are disposed within cylinders 19. It will be apparent, that cylinders 19 are disposed at opposite ends of the guide device 8 so that each of the yokes 15 are individually and simultaneously controlled to swing in a horizontal path toward and from the bar 61. The cylinders 19 are pivotally connected at 20 to bracket arms 21 preferably formed integral with the brackets 13. The yokes 15 are pivotally connected with respect to the members 13 by pivot pins 22 and whereby the yokes may swing in opposed relation to each other under the influence of the pistons. Each of the yokes 15 have their free ends semi-cylindrically notched for the reception of arcuately formed guide blocks 24. The notches of the guide blocks 24 have a diameter that permits of a slight clearance with respect to a piercing bar 61. The guide blocks 24 jointly define a substantially cylindrical guide opening for receiving the bar 61 only and the blocks 24 are identical throughout the length of the machine. It will be observed, in FIGURE 1, that the guide device 8 of each pair is slightly spaced from the guide device 7. The yokes 15 and their supported blocks 24 are automatically actuated to swing away from their guiding engagement with the bar 61 through the medium of conventional electric eyes 32 that function to actuate suitable air supply means that energize the cylinders 19 simultaneously as the hollow being formed has been extended through the leading guide device 7 to a predetermined point, thus forming a clearance for the hollow progressively through the machine and, as the hollow is progressively formed it is accurately supported in its rotative movement by the leading guide members 7.

As clearly shown, a piercing bar 61 extends through the length of the machine and is provided at its rear end with a conventional thrust bearing, common to such devices. The piercing bar 61 carries a hardened replaceable point 29 constituting the piercing element for the billet 30. The billet 30 is rotatable and axially shifted between piercing rolls 31 and whereby the billet when engaging the point 29 is caused to be pierced and conform to the maximum diameter of the point 29 as the hollow is being formed. As shown in FIGURE 1, the electric eyes are disposed between each pair of guide devices 7 and 8. As the hollow is fed through the leading guide 7 to a point where the light rays from the eye 32 will impinge upon its outer diameter, the electric eye will actuate mechanism for the control of the cylinders 19, causing the yokes and their supporting guides 24 to be shifted away from the bar 61 since, as before stated, the blocks of the guide devices 8 have a guide opening that is capable of rotatably supporting the bar 61 only.

OPERATION

The operation of the device is as follows:

The piercing bar 61 is engaged with suitable thrust bearings at the rear end of the machine and the several guide devices 8 moved to engage their guide devices with respect to the bar. If the units 7 and 8 are in proper alignment, the bar will have an accurate guiding engagement in each of the units 8 throughout the length of the machine. It is understood of course that the bar will have no accurate guiding engagement within the units 7, since the units 7 have their blocks 47 and 53 cut away to form a guide for the hollow to be formed over the bar 61. The forward end of the bar 61 and its point 29 project beyond the forward end of the machine to be disposed between the piercing rolls 31. Now, the billet 30 heated to a predetermined temperature, axially engages between the piercing rolls 31 and is forced forwardly, while at the same time being rotated. As the billet engages the point 29, the bar and its point are rotated under the influence of the rotation of the billet, causing the metal to flow over the point 29 and limited in its outward expansion by conventional piercer rolls and guide shoes. The billet is continuously fed forward by the piercer rolls in overlying and concentric relation to the bar 61 and, as its forward end engages the unit 7, the hollow will be accurately guided through the channel formed by the blocks 47 and 53 of the unit 7. As the hollow is continuously formed, it is shifted rearwardly until its forward end comes within the range of the light beam from the eye 32, at which time the cylinders 19 of the unit 8 are brought into communication with the source of compressed air causing the pistons and the piston rods 18 to move outwardly, rocking the cranks 16 upon their pivots 22, causing the yokes 15 to swing away from the bar 61 and permitting the hollow to be fed forwardly. This action is progressive throughout the length of the machine or until the hollow has been completely formed in a predetermined length. As shown in FIGURE 1, the bar will be supported against lateral flexing or bending by the blocks of the units 8 in each pair thus, securely preventing such whipping or flexing and this support for the bar is maintained until the hollow has been completely formed. The units 7 and their blocks 47 and 53 accurately hold the formed hollow and the bar against flexing by its engagement within the guide by the units 7, throughout the several groups, it being understood of course that as the hollow approaches each of the units 8, the respective cylinders 19 of the units 8 will be successively actuated to move away from the bar and to provide a clearance for the movement of the hollow along the bar 61. Each unit 8 is automatic as to its actuation under the influence of the electric eye 32. When the hollow has been completely formed, mechanism, not shown, functions to energize the cylinders 59 of the units 7 simultaneously to cause the several slides 51 and their supported blocks 53 to move from their overlying relation to the formed hollow 50. After the hollow has been completely formed, the bar 61 is withdrawn axially of the hollow at the rear end of the machine, leaving the hollow resting upon the several blocks 47 of the leading units 7. Now, there has been provided means to bodily lift the hollow from the machine to transport it laterally and such means comprises a plurality of lifting arms 33, carried by a rock shaft 34. The arms 33 underlie the formed hollow and, when the shaft 34 is actuated, the arms 33 lift the hollow and bodily shift it outwardly from the several leading guides 7 from the machine. The machine is now ready to again function as a piercing device for the seamless hollow. The bar is again fed forwardly to assume the position shown in FIGURE 1 and the several guide devices are reversely actuated to move their yokes and guide blocks into operative guiding position.

It will be apparent from the foregoing that a very novel form of guide means has been provided to accurately support both the bar 61 and the hollow being formed thereover. The units 7 and 8 are spaced at such intervals along the bed 42 as will provide a very positive guide for the bar 61 throughout the length of the hollow being formed and, as each unit 8 is actuated to move away from the bar, it furnishes adequate clearance for the hollow to be progressively formed in concentric relation to the bar. The parts are few and simple, are strong, durable, economical to manufacture and is highly successful as a continuous support for the bar and the pierced hollow forming the seamless tube or pipe and readily adapts itself to the formation of the seamless tubes or pipes as a pierced hollow by the interchange of the blocks 47 and 53 and the blocks 24. While compressed air has been indicated as the motive power to actuate the several cylinders, it will be entirely obvious that the motive power may be of a hydraulic medium.

It is to be understood that the invention is not limited to the precise construction shown, but that changes are contemplated as readily fall within the spirit of the invention, as shall be determined by the scope of the subjoined claims.

Having described my invention, what I claim as new and desire to secure by Letters Patent is:

1. In a tube mill for forming cylindrical pierced hollows that comprises a piercing bar having a piercing point for engagement by and the piercing of a heated billet, a base, a plurality of batteries of guide devices adjustably supported upon the base and whereby the several guides are disposed in axial alignment, the bar extending through the several guides, the guides being arranged in spaced pairs that include a leading and a closely positioned following guide, the leading guide having an opening of a diameter to jointly support and guide the bar and the pierced hollow being formed thereon, the following guide having an opening capable of supporting and guiding the bar only, means for shifting, the following guides of the several pairs away from the bar as the pierced hollow is progressively formed over the bar, each of the leading guides of the several pairs supporting and guiding the combined bar and pierced hollow at spaced apart points throughout the machine, means for shifting parts of the several leading guides away from the pierced hollow, means for elevating the formed pierced hollow from the guides, the leading guide of each pair comprising a base plate adjustable upon the base, the leading guides each comprising an elongated upstanding block that is transversely grooved, a removable guide block disposed in the bottom of the groove and with the upper surface of the removable guide block being transversely grooved and with the last named groove having a portion formed upon an arc corresponding to the outer diameter of the pierced hollow being formed and with the arc being axially aligned with the following guide, a slide device movable across the first named groove to and from a complete spanning relation to the groove, a stop formed upon the first named block against which the slide abuts to limit the sliding movement of the slide, a power cylinder carried by the first named block and a piston rod extending from the cylinder and connected to the slide whereby the slide is shiftable to and from the spanning relation to the first named groove and a replaceable block carried by the slide and which constitutes an upper guide for the pierced hollow.

2. In a tube mill for forming cylindrical pierced hollows comprising a piercing bar having a piercing point for engagement by and the piercing of a heated billet, a base, a plurality of batteries of guide devices adjustably supported upon the base whereby the several guides are disposed in axial alignment, the bar extending through the several guides, the guides being arranged in spaced pairs that include a leading and a closely positioned following guide, the leading guide having an opening of a diameter to jointly support and guide the bar and the pierced hollow being formed thereon, the following guide having an opening capable of supporting and guiding the bar only, means for moving the leading and following guides away from their guiding positions, means for shifting the following guides of the several pairs away from the bar as the pierced hollow is progressively formed over the bar, each of the leading guides of the several pairs supporting and guiding the combined bar and pierced hollow at spaced apart points throughout the machine, and means for elevating the formed pierced hollow above the machine, the leading guide of each pair embodying a base plate adjustable upon the base, the leading guides each including an elongated upstanding block that is transversely grooved, a removable guide block disposed in the bottom of the groove and with the upper surface of the block being transversely grooved and with the last named groove being formed in part upon an arc corresponding to the outer diameter of the pierced hollow being formed and with the arc axially aligned to the following guide, a slide device movable across the first named groove to form a complete spanning relation to the groove, a stop formed upon the first named block and against which the slide abuts to limit the sliding movement of the slide, a power cylinder carried by the first named block and a piston rod extending from the cylinder and connected to the slide whereby the slide is shiftable to form the spanning relation to the first named groove and a replaceable block carried by the slide constituting an upper overlying guide for the pierced hollow.

3. The structure according to claim 2 wherein the base plate of the leading guide devices are vertically and laterally adjustable with respect to the first named base, the said guide blocks of the leading guide having their forward edges beveled to facilitate the entry of the hollow being formed to the guiding position, the said slide being held in guiding position with respect to the lower block by cap plates.

References Cited in the file of this patent

UNITED STATES PATENTS

| | | |
|---|---|---|
| 1,017,283 | Davis | Feb. 13, 1912 |
| 1,964,507 | Diescher | June 26, 1934 |
| 1,980,168 | Davis | Nov. 13, 1934 |
| 2,050,048 | Findlater | Aug. 4, 1936 |
| 2,263,744 | Smith | Nov. 25, 1941 |
| 2,686,444 | Reichl | Aug. 17, 1954 |